United States Patent
Wu

(10) Patent No.: US 7,474,600 B2
(45) Date of Patent: Jan. 6, 2009

(54) DEVICE AND METHOD OF POLYNOMIAL POWER CONTROL FOR OPTICAL DRIVES

(75) Inventor: Jan Tang Wu, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 762 days.

(21) Appl. No.: 10/989,346

(22) Filed: Nov. 17, 2004

(65) Prior Publication Data

US 2005/0265194 A1    Dec. 1, 2005

(30) Foreign Application Priority Data

May 25, 2004    (TW) ............................. 93114694 A

(51) Int. Cl.
*G11B 7/00*    (2006.01)
(52) U.S. Cl. ................. 369/53.26; 369/30.27
(58) Field of Classification Search .............. None
See application file for complete search history.

(56) References Cited

U.S. PATENT DOCUMENTS

| | | | | |
|---|---|---|---|---|
| 5,703,841 A * | 12/1997 | Hiroki | ...................... | 369/13.24 |
| 7,133,344 B2 * | 11/2006 | Yano et al. | ................ | 369/53.26 |
| 7,200,080 B2 * | 4/2007 | Matsumoto | .............. | 369/47.12 |
| 2002/0181365 A1 * | 12/2002 | Nakajo | ..................... | 369/47.53 |
| 2003/0151993 A1 * | 8/2003 | Wai William et al. | ..... | 369/47.53 |
| 2005/0078578 A1 * | 4/2005 | Sasaki | ..................... | 369/47.53 |

* cited by examiner

*Primary Examiner*—Tan X Dinh
*Assistant Examiner*—Adam R Giesy
(74) *Attorney, Agent, or Firm*—WPAT. P.C.; Justin King

(57) ABSTRACT

The present invention provides a device and method of polynomial power control for optical drives, which is capable of controlling the laser power discharged from the optical pickup head basing on a quadratic curve fitted on a profile of constant linear velocity values and laser powers of optical pickup head. In addition, the present invention can prevent the burning failure caused by the track width of DVD disc is narrower than that of VCD disc.

7 Claims, 4 Drawing Sheets

DEVICE AND METHOD OF POLYNOMIAL POWER CONTROL FOR OPTICAL DRIVES

FIELD OF THE INVENTION

The present invention relates to a device and method of polynomial power control for optical drives, and more particularly, to a device and method for controlling power of an optical drive basing on a quadratic curve fitted on a profile of constant linear velocity value and laser power.

BACKGROUND OF THE INVENTION

Nowadays, optical disks can be found almost everywhere. Whether they are used to hold music or data, they have become the standard medium for distributing large quantities of information in a reliable package. A common optical disk is a 120 mm diameter disk of polycarbonate plastic, having a single spiral track of data, which is constructed by the "pits" and "lands", circling from the inside of the disc to the outside. If the distance between the designated data point and center of the optical disk is r, and the rotating speed of the spindle motor is $\omega$, the relative speed of the data point V with respect to the optical head can be expressed as $$V = r \cdot \omega.$$

From, it is understood that one of the three variables (V, r, $\omega$) has to be constant. Since the radius r varies with the position of the data point, only V or $\omega$ can be constant. Therefore, the spindle motor can generally rotate in two modes: Constant Linear Velocity (CLV) and Constant Angular Velocity (CAV).

If the servo system keeps V constant, the rotation mode of the spindle motor is called CLV. The advantages of CLV are that the data transfer rate is kept fixed, and that the phase lock loop (PLL) can maintain the correct data readout only by locking a fixed frequency. However, the rotating speed of the spindle motor has to change synchronously with respect to the position of the optical head. If the rotating speed keeps increasing to some extent, it shall be put into consideration that whether the spindle motor can achieve the predetermined high speed when the optical head is in inner tracks.

If the servo system keeps $\omega$ constant, the rotation mode is called CAV. It is easier to control the spindle motor in CAV mode since the spindle motor rotates with a fixed angular velocity, which is just different from CLV. However, the data transfer rate in outer tracks is higher than that in inner tracks. Therefore, the PLL has to follow the data readout to modify the fundamental frequency that should be locked when in CAV mode. Meanwhile, attention should be paid to the stability of data readout.

By virtue of this, an optical drive can either select the CLV mode or the CAV mode for controlling the rotation speed of the spindle motor while the optical pick-up head (PUH) is reading/writing an optical disk, and the same time, both modes control the laser power outputted from the PUH basing on a value of constant linear velocity (which is referred as CLV value hereinafter). In another word, the CLV mode is based on the number of revolution for controlling the laser power outputted from the PUH of an optical drive, and the CAV mode is based on the CLV values detected in the optical disk.

Please refer to FIG. 1, which is a circuitry of a DVD burner adopting CAV mode for laser power control. As seen in FIG. 1, the DVD burner 100 uses a spindle control unit of CAV mode 106 for controlling a spindle motor 104, and when an optical pickup head 105 is used for reading/writing an optical disc 103, it will output a number of signals to a synchronization signal decoder 107 for enabling the same to output a number of synchronization signals 151 to a CLV value detector 101 such that the CLV value detector 101 is enabled to calculate a CLV value 153 basing on the received synchronization signals 151 and output the calculated CLV value 153 to a laser power control 102 for enabling the same to issue a certain control signals to an automatic power control 108 where the control signal is adjusted and then fed to a laser drive for controlling the laser power outputted from the optical pickup head 105.

Refer to FIG. 2, which is a profile showing relationship between CLV values of FIG. 1 and laser powers outputted from an optical pickup head. According to the profile shown in FIG. 2, the laser power control 102 can direct the optical pickup head 105 to discharge an intended laser power by interpolation based on the CLV value detected by the laser power control 102. For example, if the CLV value 153 detected by the laser power control 102 is a value addressed as CLVx ranged between CLV1 and CLV2, the laser power Px can be acquired by interpolating the profile of FIG. 2, wherein, the CLV1 is the CLV value 153 detected while the optical pickup head 105 is reading/writing an inner track of the disc 103 in CAV mode, and the CLV2 is the CLV value 153 detected while the optical pickup head 105 is reading/writing an outer track of the disc 103 in CAV mode.

Nevertheless, the track of a DVD disc is not as wide as that of a VCD disc, that is, the track of DVD disc is narrower (i.e. about 0.74 mm) and the track of VCD disc is wider (i.e. about 1.6 mm). By virtue of this, since the conventional method of using the profile of FIG. 2 as a base for controlling the laser power discharged from the optical pickup head of a DVD burner lacks the consideration of track width, it is easy to damage the track of DVD disc during a burning process.

In view of the aforesaid description, the present invention provides a device and method of polynomial power control for optical drives, capable of adapting to the narrower track of DVD disc by controlling the optical pickup head to discharge a designated intensity of laser power during a burning process.

SUMMARY OF THE INVENTION

It is the primary object of the invention to provide a method of polynomial power control for optical drives, which is capable of controlling the laser power discharged from the optical pickup head basing on a quadratic curve fitted on a profile of constant linear velocity values and laser powers of optical pickup head.

In a preferred embodiment of the invention, a graphic profile of the aforesaid quadratic curve is composed of a plurality of segments, by which a corresponding laser power can be acquired basing on the given CLV value.

Operationally, the intensity of laser power discharged from the optical pickup head of an optical drive is controlled and derived based on the quadratic curve while the optical drive is in CAV mode. Moreover, a compensation for the discharged laser power is further provided according to a preferred embodiment of the invention, that is, when the optical pickup head of an optical drive is writing data to a designated position located in outer tracks of an optical disc in CAV mode, the servo system first switch the rotation mode to CLV mode for fixing the laser power discharged from the optical pickup head to an intensity corresponding to a fixed CLV that the discharged laser power is not going to changed with the moving optical pickup head onto different positions of the optical disc, and then the laser power discharged from the optical pickup head is further compensated with reference to a position compensation curve while the optical pickup head is writing to the outer tracks of the optical disc.

It is another object of the invention to provide a device of polynomial power control for optical drives, comprising a laser power control programmed with a quadratic curve fitted on a first profile of constant linear velocity values and laser powers of an optical pickup head, wherein the laser power control is capable of receiving a CLV value and then referring the CLV value to the quadratic curve of the first profile so as to output a first control signal for controlling the laser power discharged from an optical pickup head.

Moreover, in a preferred embodiment of the invention, the laser power control is further programmed with a second profile of constant linear velocity values and laser powers of optical pickup head, wherein the laser power control is capable of switching between the first and the second profiles by an electronic switch so as to output a first control signal for controlling the laser power discharged from an optical pickup head.

In a preferred embodiment of the invention, for avoiding information losses due to the pads connecting between devices, the laser power control further comprises: a first adder, a second electronic switch, a gain amplifier, a second adder and a third electronic switch, wherein the first adder is used for receiving a first control signal and a first compensation signal so as to output a second control signal; and the second electronic switch receives the second control signal and a first write power signal and then performs a switch operation according to the two received signals; the gain amplifier receives the first control signal and performs a gain operation on the received first control signal for the output is the same as the input only amplified; the second adder receives a second compensation signal and the gained signal outputted from the gain amplifier so as to output a third control signal; and the third electronic switch receives the third control signal and a second write power signal and then performs a switch operation according to the two received signals.

To sum up, he present invention provides a device and method of polynomial power control for optical drives, which uses a quadratic curve for controlling the laser power and is capable of adapting to the narrower track of DVD disc by controlling the optical pickup head to discharge a designated intensity of laser power during a burning process.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
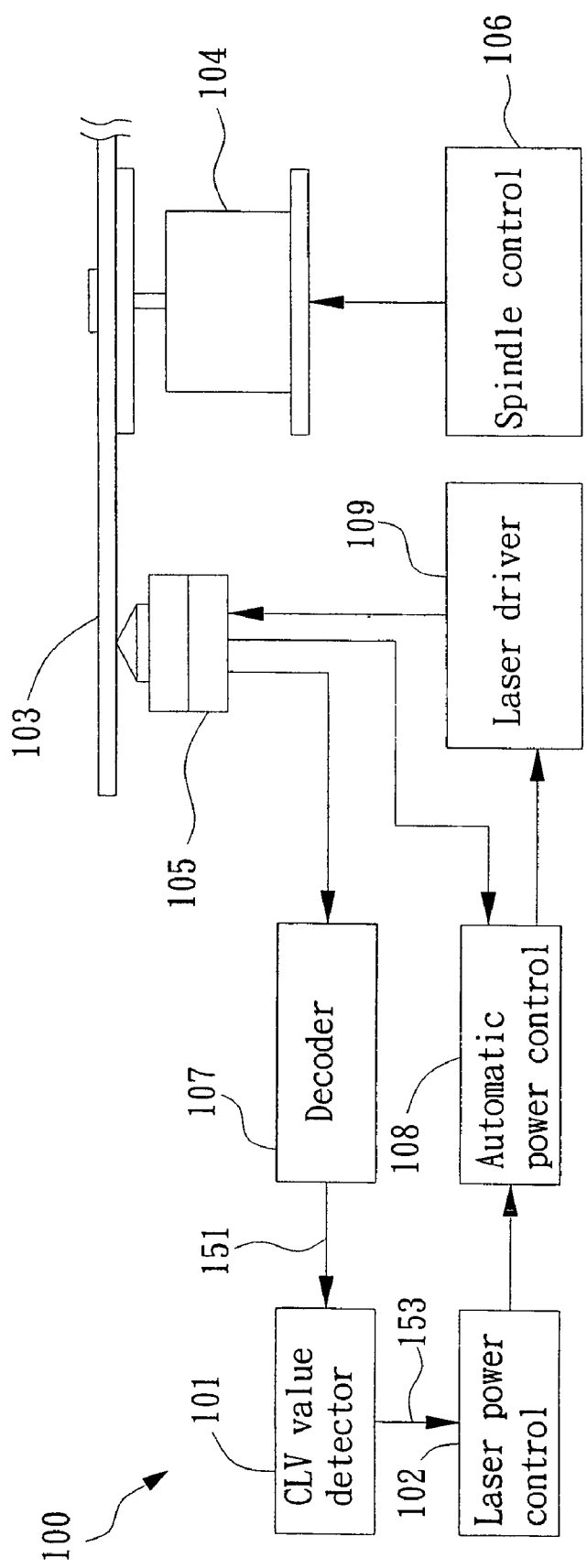
FIG. 1 is a circuitry of a DVD burner adopting CAV mode for laser power control.
Figure 2:
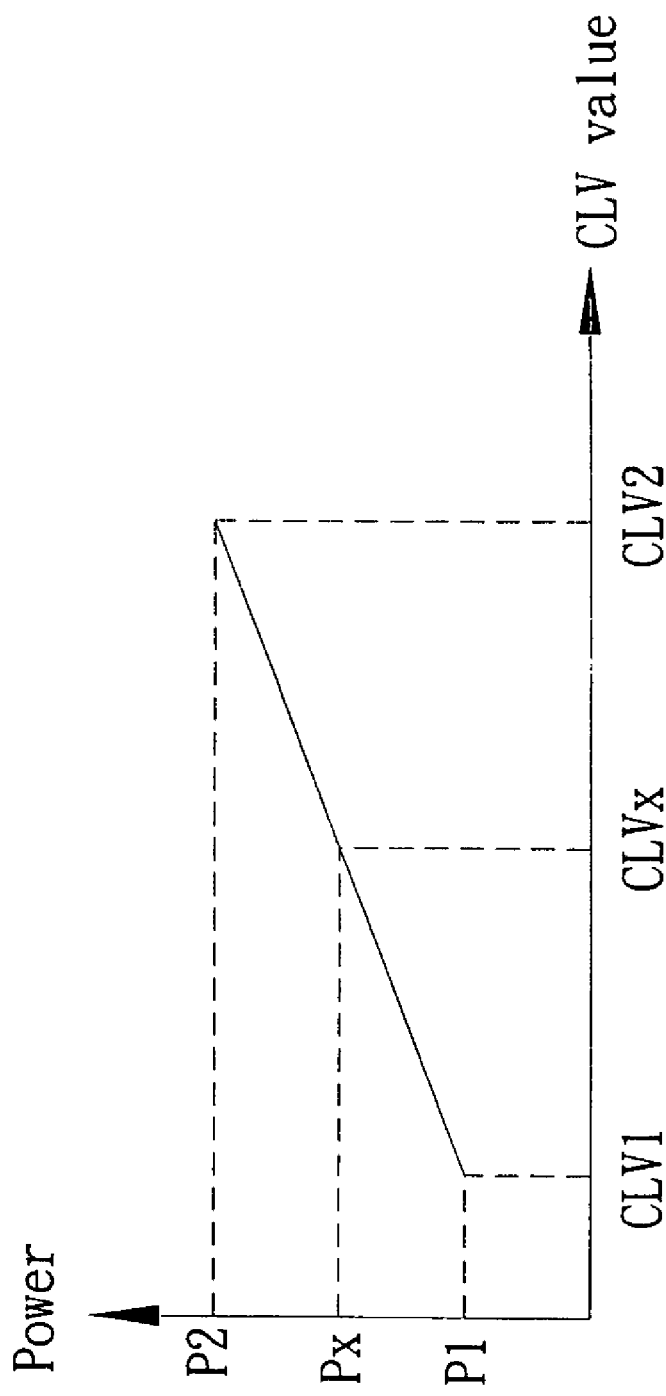
FIG. 2 is a profile showing relationship between CLV values of FIG. 1 and laser powers outputted from an optical pickup head.
Figure 3:
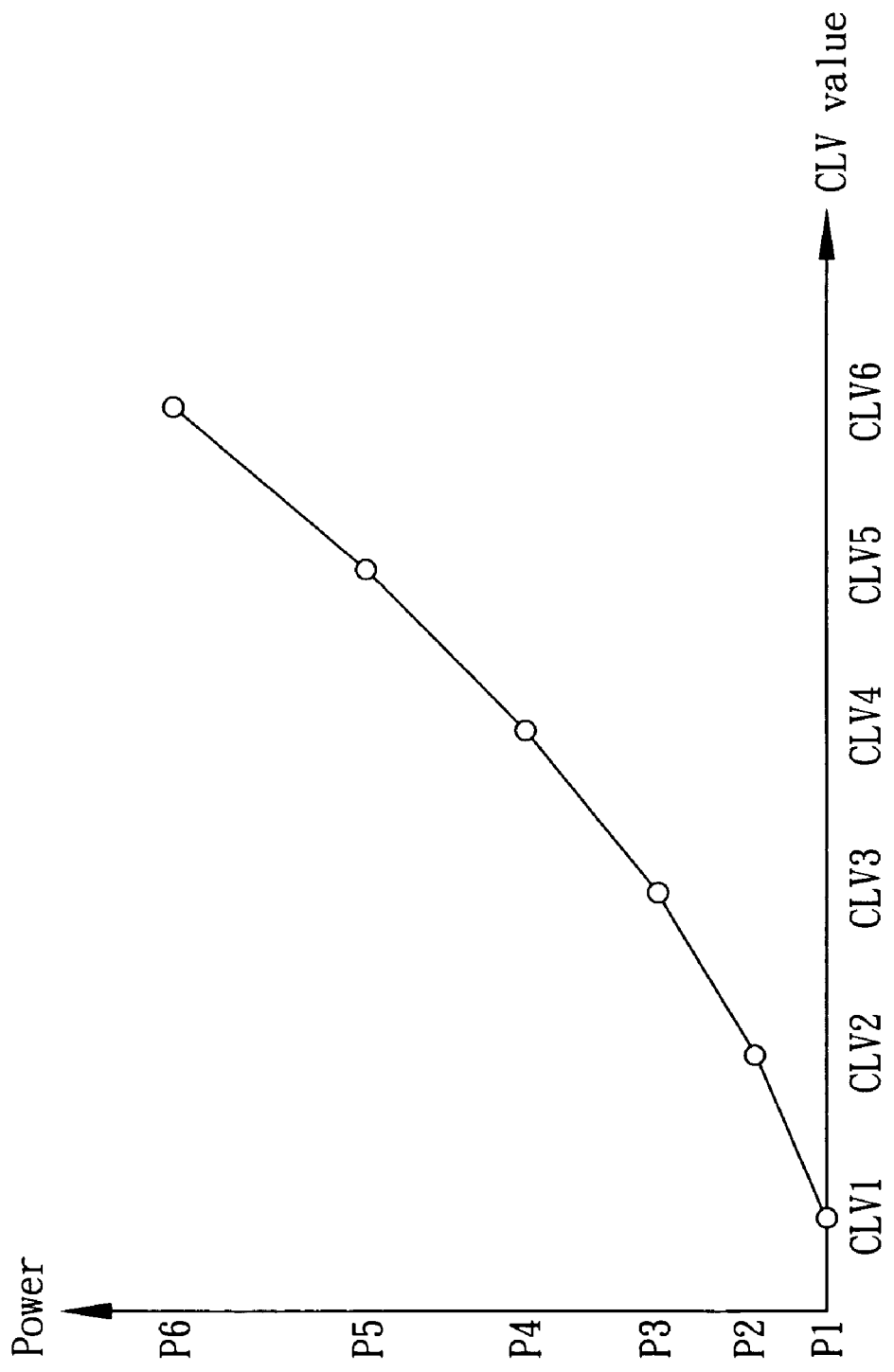
FIG. 3 is a profile showing relationship between CLV values and laser powers outputted from an optical pickup head according to a preferred embodiment of the present invention.

Please refer to FIG. 3, which is a profile showing relationship between CLV values and laser powers outputted from an optical pickup head according to a preferred embodiment of the present invention. As seen in FIG. 3, the profile illustrates that the laser powers discharged from an optical pickup head of a DVD burner in CAV mode while the same is writing on the inner tracks and outer tracks of a DVD disc are not only proportional to the CLV values, but also can be fitted with a quadratic curve since the track width of DVD is narrower than that of VCD. In this regard, the present invention adopts a quadratic curve instead of a linear segment for representing the relationship of the CLV value and laser power, such that the factor of the narrower DVD tracks can be handled.

In a preferred embodiment of the invention, a graphic profile of the quadratic curve of FIG. 3 is composed of five segments that the slope of each segment is predefined according the actual requirements. Since the slope of each segment is predefined and known, by giving a received CLV value, a laser power control arranged in the device of the invention is able to calculate a corresponding laser power and thus issues a control signal for controlling the laser power of an optical pickup head.

In addition, an interpolation method with given CLV1 and CLV2 can be used for calculating the corresponding laser power $P_x$ with reference to a CLVx as following:

$$P_x = \{(P2-P1)/(CLV1-CLV2)\} \times (CLV_x - CLV1) + P1$$

Figure 4:
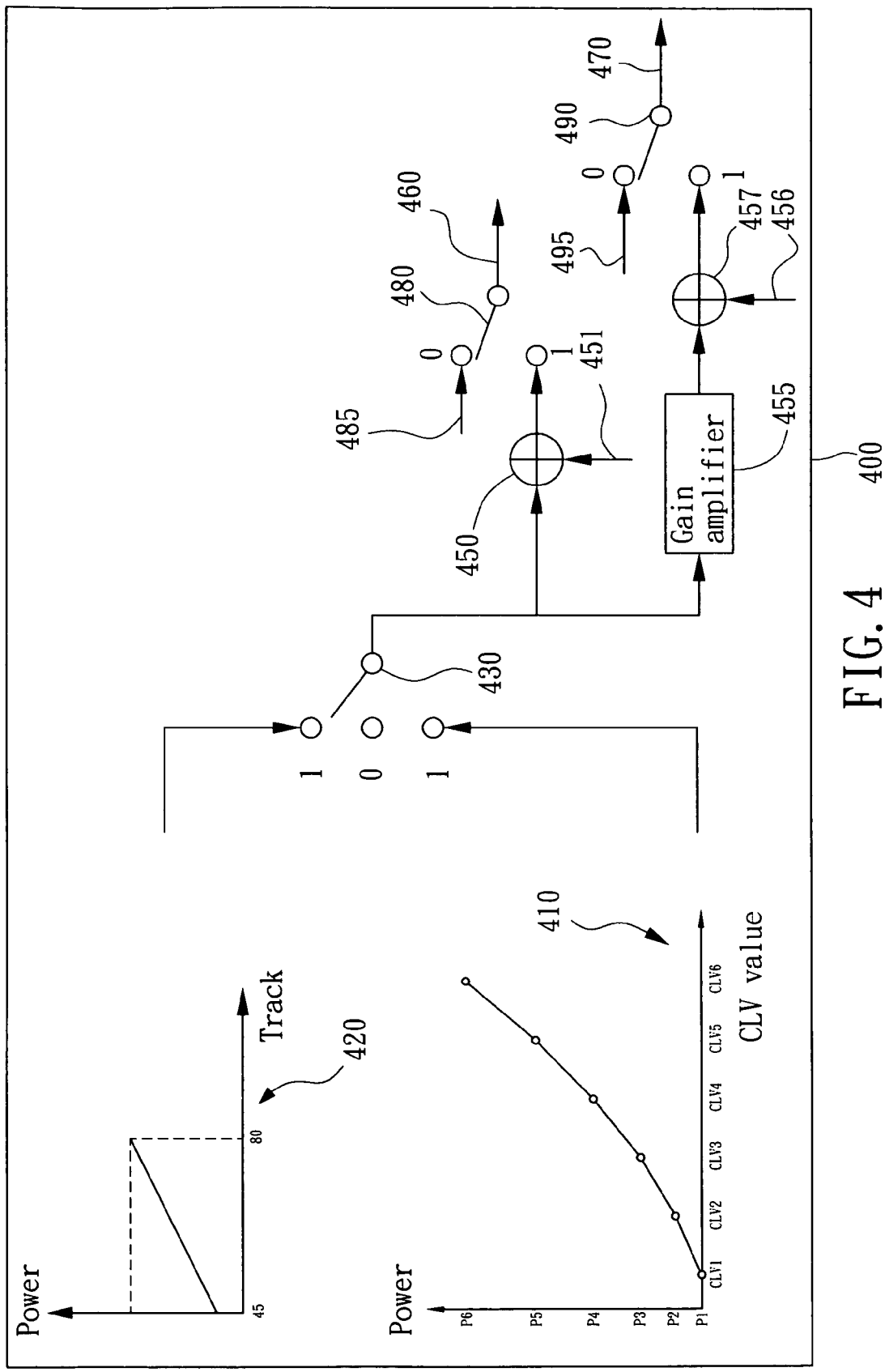
FIG. 4 is a schematic representation showing a laser power control of DVD burner according to a preferred embodiment of the present invention.

FIG. 4 is a schematic representation showing a laser power control of DVD burner according to a preferred embodiment of the present invention. Considering the situation that the DVD burner is used for writing data in a DVD disc, the laser power control 400 of FIG. 4 not only can provide a quadratic-curve profile of CLV value and laser power 410, but also can provide a linear position compensation curve 420 for compensating the laser power while the optical pickup head is writing on the outer tracks of a DVD disc.

By the function of the electronic switch 430 of FIG. 4, the laser power control 400 can be switched to control the laser power either basing on the profile 410 or on the profile 420. According to a preferred embodiment of the invention, while the optical pickup head of a DVD burner is starting to write data on a DVD disc, that is, while the optical pickup head starts to write data on the inner tracks of the DVD disc in CAV mode, the laser power control 400 employs the profile 410 for controlling the laser power discharged from the optical pickup head, and while the burning proceeds to and beyond a predefined position of the outer tracks of the DVD disc (e.g. between the $45^{th}$ Min and the $80^{th}$ Min), the optical pickup head switches from the CAV mode to the CLV mode and employs the profile 420 for controlling the laser power discharged from the optical pickup head.

As the optical pickup head proceeds with a burning process from the inner tracks to the outer tracks of a DVD disc under CAV mode, it is necessary to increase the laser power outputted from the optical pickup head for writing data on the DVD disc smoothly since the linear velocity V is increasing. For enabling a smooth burning process and also considering that the track width of DVD disc is narrower than that of VCD disc, a smooth quadric curve is used for fitting the profile 410. Moreover, As the optical pickup head proceeds with a burning process to and beyond a predefined position on the outer tracks of the DVD disc, the spindle motor is restricted by the mechanical limitation and thus it is necessary to switch the rotation mode to CLV mode for fixing the linear velocity and thus the laser power is also fixed, such that a compensation basing on the profile 420 is used for minutely adjusting the discharged laser power so as to provide larger laser power for avoiding burning failure while the burning process is progressing to outer tracks.

In addition, the present embodiment also consider the information losses due to the connection pads, that is, the signal losses between the pads connecting the laser power control 400 and the automatic power control (not shown). Therefore, a compensation control is further added to the output stage of the laser power control 400, namely, a compensation control mechanism is added to the output path of the electronic switch 430, which comprises the steps of: using an adder 450 for receiving a write power compensation signal 451 and a signal outputted from the electronic switch 430 so as to output a control signal 460 for controlling the laser power discharged from the optical pickup head; using a gain amplifier 455 for receiving signal outputted from the electronic switch 430 and performing a gain operation on the received signal as the output thereof; using an adder 457 for receiving an OPU compensation signal 456 and the gained signal outputted from the gain amplifier 455 so as to output a control signal 470 for controlling the laser power discharged from the optical pickup head; wherein, as the information losses of the control signals 460, 470 is too sever to be employed, an electronic switch 480 is enabled for switching the signal received from the adder 450 to a write power signal 485, and an electronic switch 490 is enabled for switching the signal received from the adder 457 to an OPU power signal 495 so that the signals 485, 495 can be employed respectively as the control signals 460, 470. The compensation control mechanism adapted for poor pad connection is as described hereinbefore, which is achieved by using the laser power control for controlling the signals 460, 470 outputted from the same to the automatic power control.

To sum up, the present invention provides a device and method of polynomial power control for optical drives, which is capable of coarse-tuning and fine-tuning the laser power discharged from the optical pickup head respectively basing on a quadratic curve fitted on a profile of constant linear velocity values and laser powers of optical pickup head and a profile of position power compensation. In addition, the polynomial means is able to handle the burning failure caused by the narrower track width of DVD disc, and also can provide a compensation control to the output stage of the polynomial power control device of the present invention so as to prevent the burning failure caused by poor pad connection.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method of polynomial power control for an optical drive, comprising the steps of:
   providing a quadratic curve fitted on a profile of constant linear velocity values and laser powers for controlling laser powers of the optical drive;
   providing a linear compensation segment fitted to a profile of track numbers and laser powers instead of the quadratic curve for controlling laser powers of the optical drive while an optical pickup head of the optical drive writes data to and beyond a designated position located at outer tracks of an optical disc; and
   switching between the quadratic curve and the linear compensation segment to output a first control signal for controlling the laser power discharged from the optical pickup head.

2. The method as recited in claim 1, wherein the method further comprising the step of:
   forming a graphic profile of the quadratic curve being composed of linear segments.

3. The method as recited in claim 2, wherein the method further comprising the step of:
   acquiring a laser power corresponding to a given constant linear velocity value by interpolating based on the quadratic curve.

4. The method as recited in claim 2, wherein the method further comprising the step of:
   controlling laser powers of the optical drive basing on the quadratic curve while the optical drive in a rotation mode of constant angular velocity (CAV mode).

5. The method as recited in claim 2, wherein the method further comprising the step of:
   forming a graphic profile of the quadratic curve being composed of five segments.

6. A device of polynomial power control for an optical drive, comprising:
   a laser power control, programmed with a quadratic curve fitted on a first profile of constant linear velocity values and laser powers of an optical pickup head, wherein the laser power control is capable of receiving a constant linear velocity value and then referring the constant linear velocity value to the quadratic curve of the first profile so as to output a first control signal for controlling the laser power discharged from the optical pickup head; wherein said laser power control is further programmed with a second profile for providing a linear compensation segment fitted to a profile of track numbers and laser cowers instead of the quadratic curve for controlling laser powers of the optical drive while an optical pickup head of the optical drive writes data to and beyond a designated position located at outer tracks of an optical disc; and
   a first electronic switch, wherein the laser power control is capable of switching between the first and the second profiles by the first electronic switch for outputting the first control signal.

7. The device as recited in claim 6, wherein the laser power control further comprises:
   a first adder, for receiving a first control signal and a first compensation signal so as to output a second control signal;
   a second electronic switch, for switching between the second control signal and a first write power signal and then performing a switch operation according to the two received signals;
   a gain amplifier, for receiving the first control signal and performing a gain operation on the received first control signal for output is the same as the input only amplified;
   a second adder, for receiving a second compensation signal and the gained signal outputted from the gain amplifier so as to output a third control signal; and
   a third electronic switch, for switching between the third control signal and a second write power signal and then performing a switch operation according to the two received signals.

* * * * *